United States Patent [19]
Clopton

[11] Patent Number: 6,062,378
[45] Date of Patent: May 16, 2000

[54] ACCUMULATING CONVEYOR CHAIN WITH CONTROLLED FRICTION

[75] Inventor: Robert T. Clopton, Magnolia, Ky.

[73] Assignee: Tekno, Inc., Cave City, Ky.

[21] Appl. No.: 09/014,870

[22] Filed: Jan. 28, 1998

[51] Int. Cl.[7] .................................................. B65G 35/00
[52] U.S. Cl. ...................................... 198/867.13; 198/779
[58] Field of Search ................................ 198/867.13, 779

[56] References Cited

U.S. PATENT DOCUMENTS

| | | | |
|---|---|---|---|
| 1,852,942 | 4/1932 | Streine . | |
| 2,827,089 | 3/1958 | Amori . | |
| 2,929,484 | 3/1960 | Longdon | 198/867.14 |
| 3,092,237 | 6/1963 | Miller | 198/867.13 |
| 3,221,867 | 12/1965 | Bergling et al. . | |
| 3,407,919 | 10/1968 | Sandefur | 198/867.13 |
| 4,331,229 | 5/1982 | Kamm | 198/345 |
| 4,579,219 | 4/1986 | Burkhardt . | |
| 4,718,543 | 1/1988 | Leisner et al. | 198/779 |
| 4,724,951 | 2/1988 | Shinkawa et al. | 198/803.01 |
| 4,730,719 | 3/1988 | Brown et al. . | |
| 4,736,834 | 4/1988 | Kotegawa et al. . | |
| 4,742,905 | 5/1988 | Beers . | |
| 4,892,186 | 1/1990 | Frei | 198/803.01 |
| 4,974,519 | 12/1990 | Miletto | 198/165 |
| 5,046,598 | 9/1991 | Colamussi | 198/465.1 |
| 5,143,205 | 9/1992 | Fujimoto . | |
| 5,344,001 | 9/1994 | Kawaai et al. . | |
| 5,461,851 | 10/1995 | Lehrieder et al. . | |
| 5,467,860 | 11/1995 | Clopton . | |
| 5,549,194 | 8/1996 | Dag . | |

FOREIGN PATENT DOCUMENTS

| | | |
|---|---|---|
| 6-46888 | 9/1988 | Japan . |
| 6-144534 | 5/1994 | Japan . |
| 6-183533 | 7/1994 | Japan . |

OTHER PUBLICATIONS

Tsubaki Brochure Prior to Jan. 28, 1998 2 pages.

*Primary Examiner*—Christopher P. Ellis
*Assistant Examiner*—Joe Dillon, Jr.
*Attorney, Agent, or Firm*—Theresa Fritz Camoriano; Camoriano + Associates

[57] ABSTRACT

A conveyor system is provided, in which the drive chain which drives products along the conveyor has features that permit control of the threshold driving force that will be reached before the chain's carrier rollers begin to rotate to permit accumulation of product on the conveyor. The threshold driving force is controlled by friction members which are located between split portions of the carrier rollers and by the angle of the outer surface of the carrier rollers. The steeper the angle, the greater the threshold force.

12 Claims, 4 Drawing Sheets

ACCUMULATING CONVEYOR CHAIN WITH CONTROLLED FRICTION

BACKGROUND OF THE INVENTION

The present invention relates to conveyor chains for accumulating conveyors. Accumulating conveyor chains are known. These chains generally include a roller which carries a product, and, when the products begin to back up on the conveyor, the rollers begin to rotate, allowing the products to sit on top of the chain while the chain continues to run, without creating a large back line pressure on the products. A problem that can be encountered with such chains is that, if a substantial driving force is needed to move the products, the rollers may begin to rotate too soon, so that the products are not moved by the conveyor. Prior art accumulating conveyors generally do not allow control or adjustment of the threshold force at which the rollers begin to rotate.

SUMMARY OF THE INVENTION

The present invention provides a chain design in which the threshold force at which the rollers begin to rotate is controlled. In the design of the present invention, the central carrier roller that carries the product is made in two pieces, and a friction member is mounted between the two roller pieces so as to restrict rotation of the roller pieces until a threshold force is reached. Also, in the preferred embodiment, the central carrier roller pieces may be tapered at various angles, in order to control the amount of friction force exerted on the roller pieces by the friction member.

DESCRIPTION OF THE PREFERRED EMBODIMENT

Figure 1:
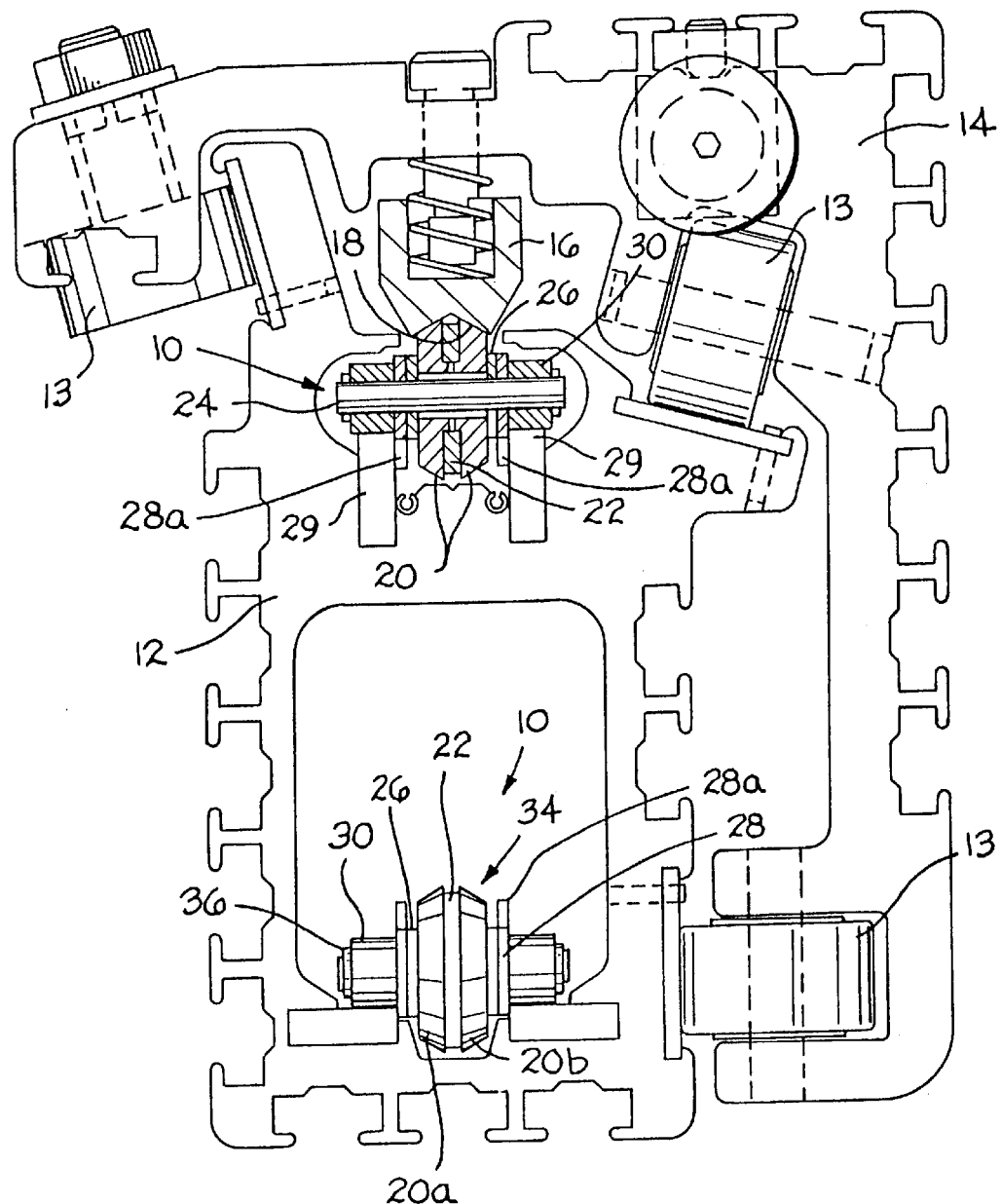
FIG. 1 is a sectional view through a conveyor using a chain made in accordance with the present invention.

FIGS. 1–5 show an example of a chain 10 made in accordance with the present invention. FIG. 1 shows the chain 10 mounted on an extruded support frame 12, and driving a carriage 14. The weight of the carriage 14 is carried on the support frame 12 by rollers 13, which roll along the support frame 12. The carriage 14 includes a spring-biased drive member 16, the bottom surface 18 of which has an inverted V-shape. The contour of the inverted V-shaped bottom surface 18 of the drive member 16 is the same as the contour 34 of the carrier rollers 20 of the chain 10. As will be explained later, the slope of the V-shaped contour affects the drive force with which the chain 10 drives products being carried on the chain, and different slopes can be used, as needed. The carrier roller 20 is made in two pieces 20a, 20b, and a friction member 22 is mounted between and in friction contact with the pieces 20a, 20b. The friction member 22 is recessed below the outer drive surface 34 of the carrier roller 20 and does not extend above that drive surface 34. The friction member 22 prevents the carrier roller 20 from rotating until some threshold force is reached. This means that the chain 10 will drive the carriages 14 until the threshold force is reached. Once the threshold force is reached, the carrier rollers 20 will rotate so that the carriages 14 remain stationary as the chain 10 passes under the carriages 14.

Figure 2:
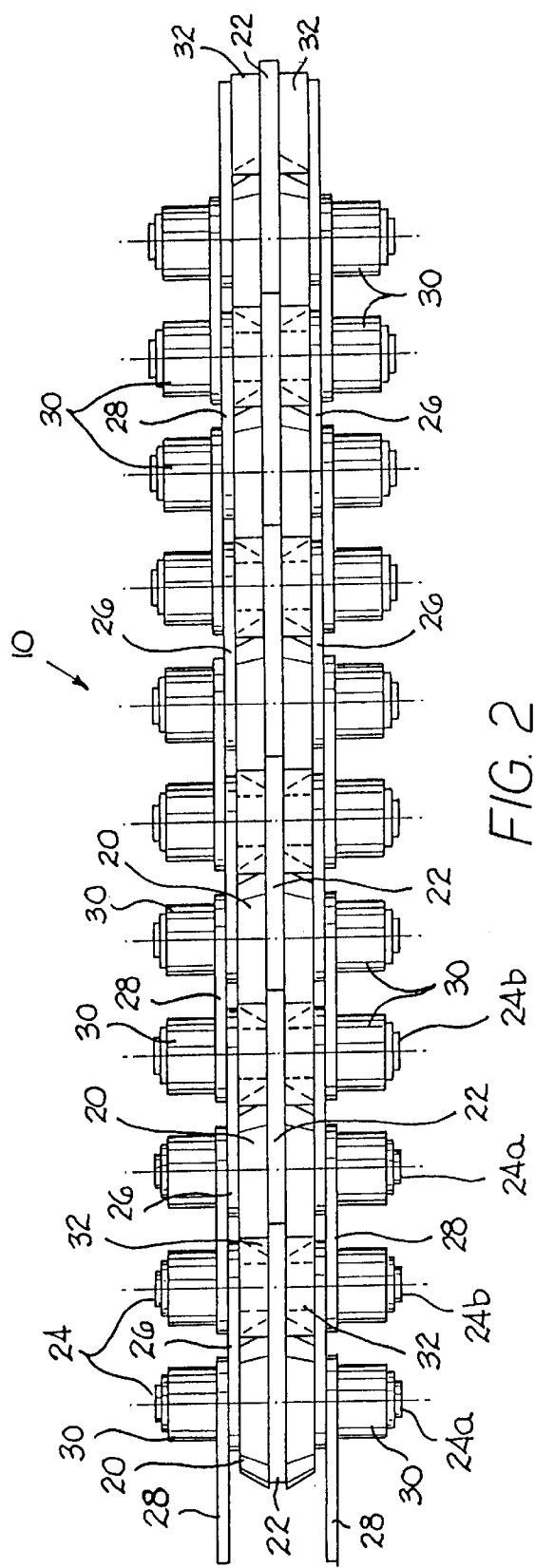
FIG. 2 is a top view of the chain of FIG. 1.
Figure 3:
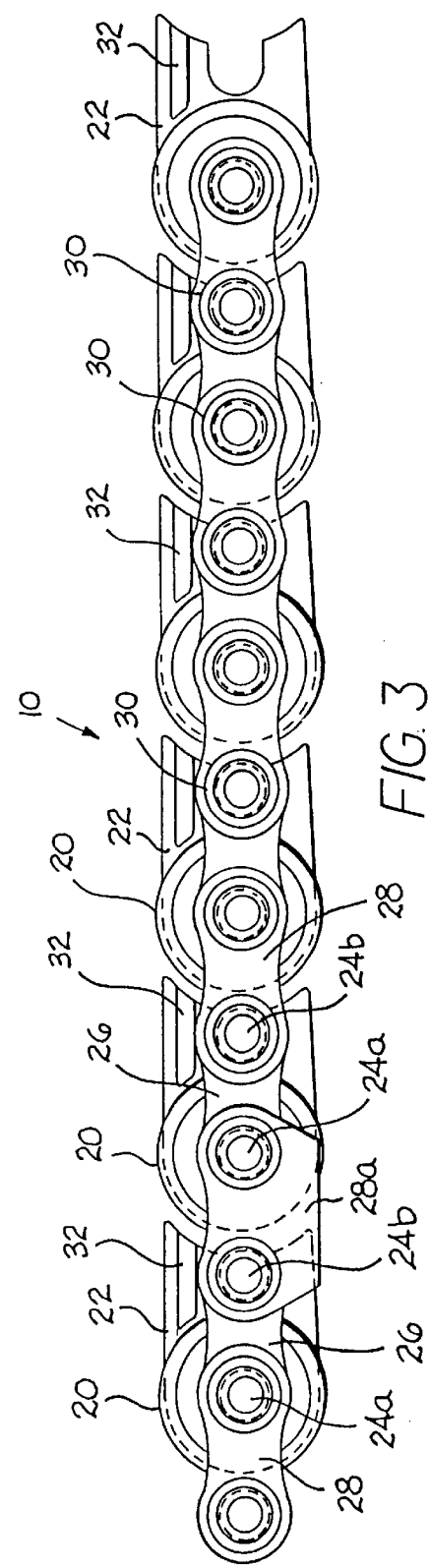
FIG. 3 is a side view of the chain of FIG. 1.

FIG. 1 also shows that, in addition to the carrier roller 20 and the friction member 22, the chain 10 includes chain pins 24, inner sidebars 26, outer sidebars 28, and support rollers 30. At intervals along the chain 10 are pairs of outer guiding sidebars 28a, which project downwardly to help guide the chain 10 between the rails 29 of the frame 12. As shown in FIGS. 2 and 3, the carrier rollers 20 are mounted on every odd-numbered chain pin 24a, while the even-numbered chain pins 24b do not carry a carrier roller 20. (The use of the terms even-numbered and odd-numbered is arbitrary. The odd-numbered pins 24a may also be referred to herein as forward pins, and the even-numbered pins 24b may be referred to as rear pins.) All the chain pins 24a, 24b carry left and right support rollers 30, which roll along the frame 12 as the chain 10 is driven. The mechanism for driving the chain 10 is not shown in these drawings but includes a drive sprocket, as is well known in the art. The friction members 22 are mounted on the odd-numbered chain pins 24a but also partially encircle the even-numbered chain pins 24b, which prevents the friction members 22 from rotating relative to the chain 10. It would be possible to use other known methods to prevent the friction members 22 from rotating relative to the chain 10, such as keying the friction members 22 to the pins 24 or to the bushings 42 or press fitting them onto the chain 10, but this embodiment is preferred. Each of the friction members 22 includes horizontally-projecting wings 32, which cover a space in the chain 10, preventing dirt and debris from getting into the chain 10.

Figure 4:
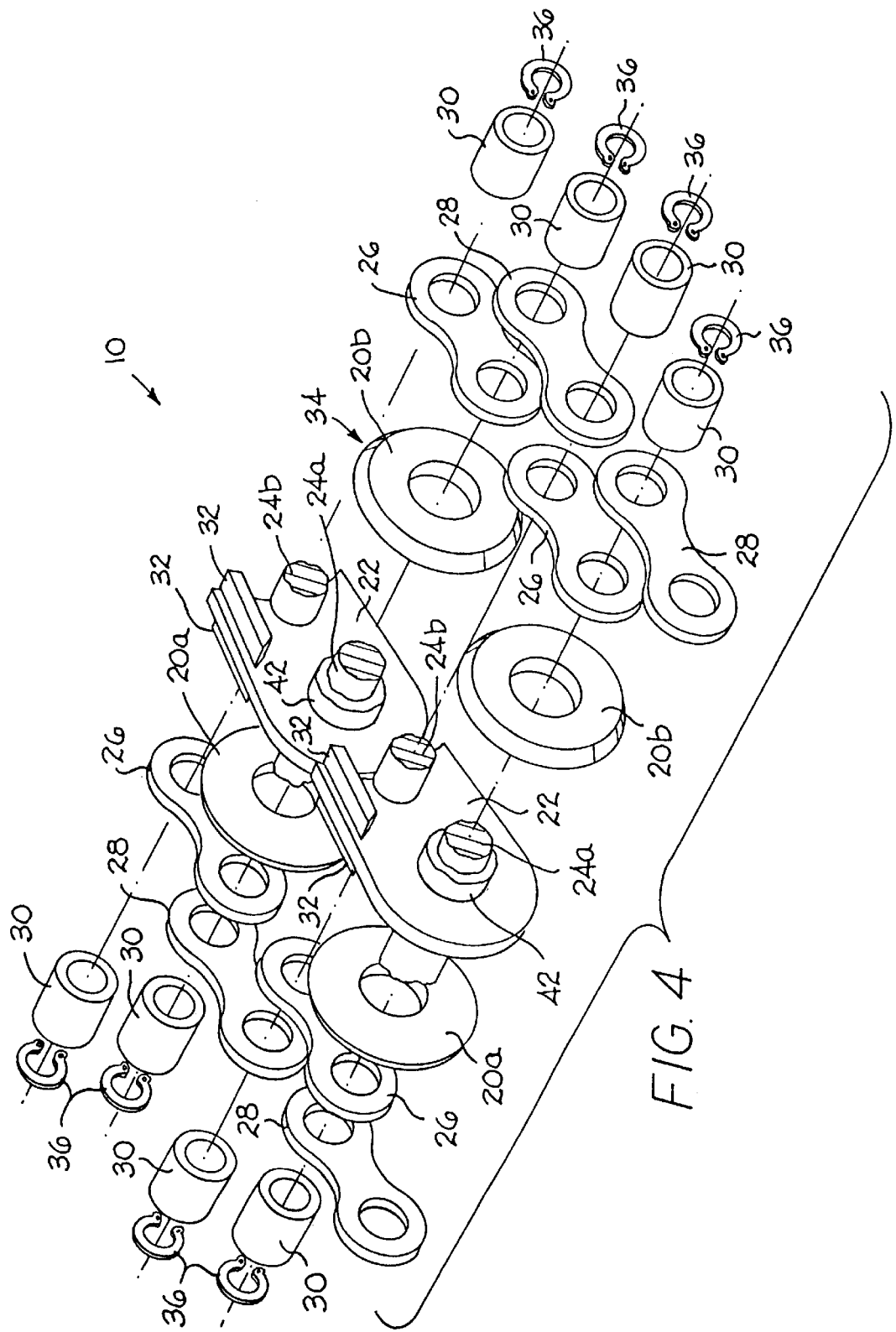
FIG. 4 is an exploded perspective view of a portion of the chain of FIG. 1.

FIG. 4 is an exploded perspective view of the chain 10, showing the odd-numbered pins 24a, the even-numbered pins 24b, the friction members 22 with wings 32, the carrier roller halves 20a, 20b, each having a tapered outer edge surface, so that, when they are put together, they form an inverted V-shaped drive surface 34, which contacts the complementary-shaped bottom surface 18 of the drive member 16. FIG. 4 also shows the inner sidebars 26, outer sidebars 28, support rollers 30, and snap-rings 36, which fit into ring-shaped grooves 38 in the pins 24 (shown in FIG. 5).

Figure 5:
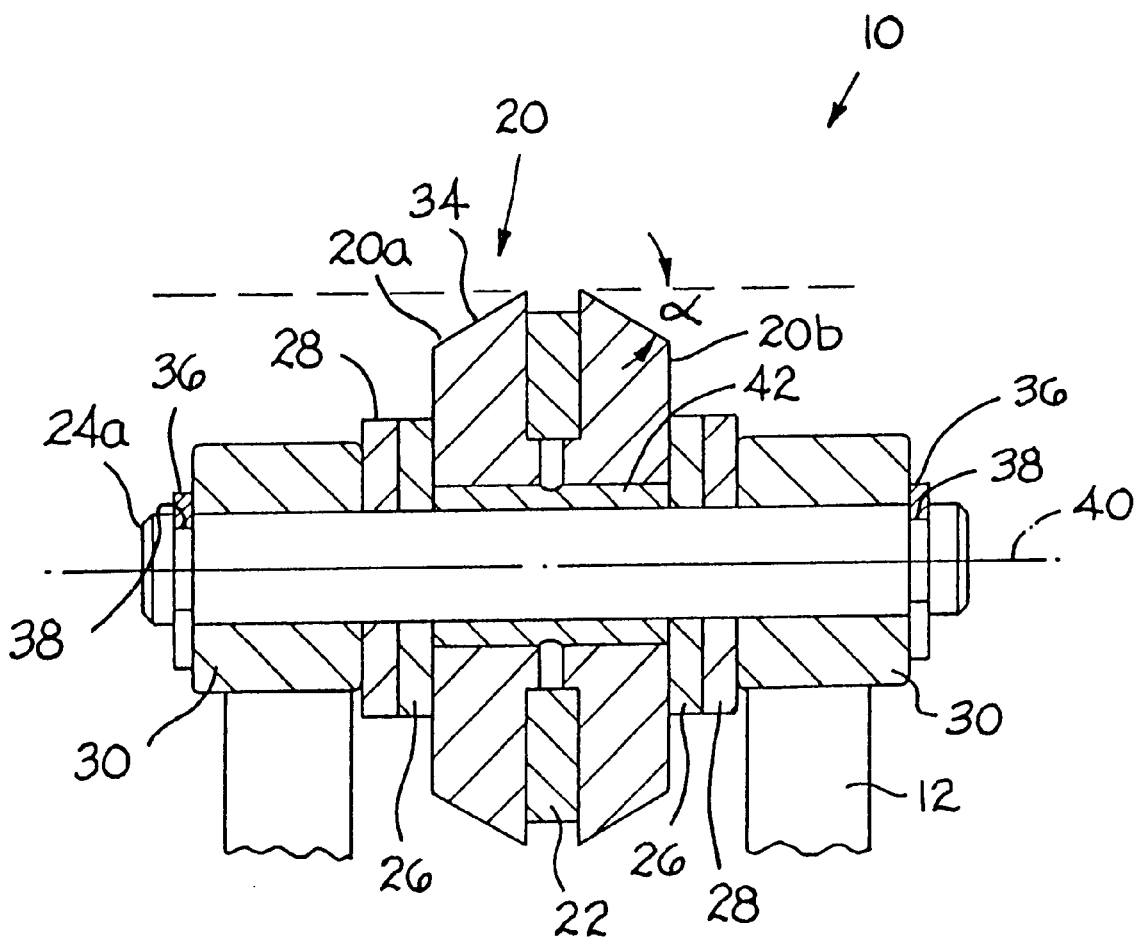
FIG. 5 is an enlarged front sectional view of the chain of FIG. 1.

FIG. 5 is the same sectional view of the chain 10 as shown in the top portion of FIG. 1, but it is enlarged to show more detail. It can be seen that there is a bushing 42, pressed onto the odd-numbered pins 24a, on which the split carrier roller 20 is mounted. As shown in this view, there is an angle $\alpha$ between the drive surface 34 of the carrier roller portions 20a, 20b and the horizontal (shown in phantom). The axis 40 of the pin 24 defines the horizontal direction. In this preferred embodiment, the angle $\alpha$ is 15°. The angle $\alpha$ may vary, depending upon the desired threshold friction force. The greater the angle $\alpha$, the greater the threshold friction force, because, as the angle $\alpha$ increases, the spring force on the drive member 16 exerts a greater horizontal force on the carrier roller halves 20a, 20b, pushing them toward each other and against the friction member 22 with greater force. The greater the horizontal force against the friction member 22, the greater the friction force between the friction member 22 and the carrier roller halves 20a, 20b, and the greater the threshold force required to cause rotation of the carrier rollers 20 relative to the chain 10, meaning that the chain 10 will exert a greater drive force on the products being driven before the carrier rollers 20 begin to rotate relative to the chain 10.

The threshold force of the chain may also be varied by varying the materials used to make the chain. The higher the coefficient of friction between the carrier roller portions 20a, 20b and the friction member 22, the greater the threshold force.

So, the present invention provides an arrangement whereby the threshold force of the chain may be controlled, to ensure that the products are driven up to the threshold force before the chain goes into an idling or accumulation mode, in which the carrier rollers rotate as the chain passes under the stationary products.

It will be obvious to those skilled in the art that modifications may be made to the embodiment described above without departing from the scope of the present invention.

What is claimed is:

1. A chain, comprising:

a plurality of links, each link including left and right sidebars; and chain pins extending through the sidebars; left and right support rollers and at least one split carrier roller rotatably mounted on one of the chain pins, said split carrier roller comprising two separate roller pieces located between and projecting above the left and right support rollers; a friction member mounted between and in friction contact with said carrier roller pieces which restricts rotation of the carrier roller pieces.

2. A chain, as recited in claim 1, wherein said split carrier roller has a V-shaped outer drive surface and wherein said friction member is recessed below said outer drive surface.

3. A chain, as recited in claim 1, wherein said chain pins define a horizontal axis of rotation, wherein there is a plurality of said split carrier rollers mounted on a plurality of said chain pins, and wherein said split carrier rollers have outer drive surfaces which are oriented at an angle relative to the horizontal direction.

4. A chain, as recited in claim 1, wherein said split carrier roller has a tapered outer edge surface.

5. A chain link, comprising:

left and right sidebars; a forward pin extending through the left and right sidebars; a rear pin extending through the left and right sidebars; a split carrier roller including two carrier roller portions mounted on the forward pin; a friction member mounted on the forward pin between the carrier roller portions and projecting to the rear pin and at least partially encircling the rear pin which prevents the friction member from rotating.

6. A chain link as recited in claim 5, and further comprising left and right support rollers mounted on each of said forward and rear pins.

7. A chain link as recited in claim 6, wherein said friction member includes wings, which project horizontally over spaces in the chain, thereby preventing debris from getting into the chain.

8. A chain link as recited in claim 5, wherein the axes of said pins define a horizontal direction and wherein said carrier roller portions have outer drive surfaces which are oriented at an angle relative to the horizontal direction.

9. A chain link, as recited in claim 5, wherein said split carrier rollers have a V-shaped outer surface.

10. A conveyor, comprising:

a support frame;

a carriage, including rollers which roll on said support frame; said carriage including a spring-biased drive member; said drive member defining a V-shaped drive surface; and a drive chain mounted on said support frame, said drive chain including left and right sidebars; forward pins; rear pins; split carrier rollers each including two carrier roller portions mounted on the forward pins, said carrier rollers defining a complementary V-shaped drive surface; and friction members mounted on the forward pins between the respective carrier roller portions.

11. A chain, comprising:

a plurality of links; and a plurality of horizontal chain pins connecting the links together; wherein at least one of said links includes left and right carrier roller portions rotatably mounted on one of said chain pins, said left and right carrier roller portions each having a tapered outer drive surface so that, together, they form a substantially V-shaped outer drive surface; and a friction member mounted between and in friction contact with said left and right carrier roller portions which restricts the rotation of the carrier roller portions, wherein said friction member does not project above said V-shaped outer drive surface.

12. A chain as recited in claim 11, wherein said friction member is mounted on one of said chain pins and includes a projection which communicates with an adjacent chain pin so as to prevent said friction member from rotating.

\* \* \* \* \*